(12) United States Patent
Furusawa et al.

(10) Patent No.: US 9,401,520 B2
(45) Date of Patent: Jul. 26, 2016

(54) FUEL CELL SYSTEM AND METHOD FOR STOPPING OPERATION OF FUEL CELL SYSTEM

(71) Applicant: HONDA MOTOR CO., LTD., Tokyo (JP)

(72) Inventors: Koichiro Furusawa, Wako (JP); Nobutaka Nakajima, Wako (JP); Kaoru Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 703 days.

(21) Appl. No.: 13/744,417

(22) Filed: Jan. 18, 2013

(65) Prior Publication Data

US 2013/0196240 A1 Aug. 1, 2013

(30) Foreign Application Priority Data

Jan. 23, 2012 (JP) .................................. 2012-010599

(51) Int. Cl.
*H01M 8/04* (2016.01)

(52) U.S. Cl.
CPC ...... *H01M 8/04231* (2013.01); *H01M 8/04097* (2013.01); *H01M 8/04388* (2013.01); *H01M 8/04559* (2013.01); *H01M 8/04753* (2013.01); *H01M 8/04955* (2013.01); *Y02E 60/50* (2013.01)

(58) Field of Classification Search
None
See application file for complete search history.

(56) References Cited

U.S. PATENT DOCUMENTS

| 7,691,508 B2 | 4/2010 | Goebel | |
|---|---|---|---|
| 2008/0044703 A1* | 2/2008 | Shimoi | H01M 8/04223 429/413 |
| 2010/0035098 A1* | 2/2010 | Ramani | H01M 8/04223 429/429 |
| 2011/0200901 A1* | 8/2011 | Reiser | H01M 8/04097 429/429 |

FOREIGN PATENT DOCUMENTS

| JP | 2007-506243 | 3/2007 |
|---|---|---|
| JP | 2007-323863 | 12/2007 |
| JP | 2009-093800 | 4/2009 |
| JP | 2009-252544 | 10/2009 |
| WO | WO 2010056224 | * 5/2010 |

OTHER PUBLICATIONS

Machine translation of JP 2007-323863, Dec. 2007.*
Machine translation of JP 2009-093800, Apr. 2009.*

(Continued)

*Primary Examiner* — Jonathan Crepeau
(74) *Attorney, Agent, or Firm* — Mori & Ward, LLP

(57) ABSTRACT

In a method for stopping an operation of a fuel cell system, supply of a fuel gas to an anode side of a fuel cell provided in the fuel cell system is stopped. A fuel exhaust gas discharged from the fuel cell is recirculated to the anode side of the fuel cell. An oxidant-exhaust-gas discharge path through which an oxidant exhaust gas is to be discharged from the fuel cell is sealed at a downstream position of a connecting portion at which the oxidant-exhaust-gas discharge path is connected to an oxidant-exhaust-gas recirculation path. The oxidant exhaust gas is recirculated to a cathode side of the fuel cell through the oxidant-exhaust-gas recirculation path. Recirculation of the fuel exhaust gas is stopped. Recirculation of the oxidant exhaust gas is stopped. An oxidant-gas supply path through which an oxidant gas is to be supplied to the fuel cell is sealed.

21 Claims, 6 Drawing Sheets

(56) References Cited

OTHER PUBLICATIONS

Japanese Office Action for corresponding JP Application No. 2012-010599, Nov. 20, 2013.

"New Development on Research on Batteries/Fuel Cells—Aiming At Achieving Low-Carbon Society—Efforts to Overcoming The Problems of Approaching Practical Application of Solid Polymer Electrolyte Fuel Cells", by Kazumi Tanimoto and Isao Nagai, AIST Today, Aug. 1, 2009, vol. 9, No. 8, p. 12-13.

* cited by examiner

FUEL CELL SYSTEM AND METHOD FOR STOPPING OPERATION OF FUEL CELL SYSTEM

CROSS-REFERENCE TO RELATED APPLICATIONS

The present application claims priority under 35 U.S.C. §119 to Japanese Patent Application No. 2012-010599, filed Jan. 23, 2012, entitled "Operation Stopping Method for Fuel Cell System, and Fuel Cell System." The contents of this application are incorporated herein by reference in their entirety.

BACKGROUND OF THE INVENTION

1. Field of the Invention

The present disclosure relates to a fuel cell system and a method for stopping an operation of the fuel cell system.

2. Discussion of the Background

A fuel cell supplies a fuel gas (gas essentially containing hydrogen, e.g., hydrogen gas) to an anode electrode, and supplies an oxidant gas (gas essentially containing oxygen, e.g., air) to a cathode electrode to cause an electrochemical reaction of the gases, which provides DC current energy.

A solid polymer electrolyte fuel cell, for example, is known as one kind of fuel cell. The solid polymer electrolyte fuel cell includes a membrane electrode assembly (MEA) having an anode electrode and a cathode electrode provided on the respective sides of an electrolyte membrane formed by a polymer ion exchange membrane, and supported by a pair of separators. A fuel gas passage for supplying the fuel gas to the anode electrode is formed between one of the separators and the MEA, and an oxidant gas passage for supplying the oxidant gas to the cathode electrode is formed between the other separator and the MEA.

At the time the fuel cell is stopped, the supply of the fuel gas and the oxidant gas is stopped, but the fuel gas remains in the fuel gas passage in the fuel cell and the oxidant gas remains in the oxidant gas passage in the fuel cell. Accordingly, when the halt period of the fuel cell is long, in particular, the remaining fuel gas and oxidant gas may penetrate the electrolyte membrane to impair the electrode catalyst and the catalyst support, thus shortening the service life of the fuel cell.

To cope with the shortcoming, Japanese Unexamined Patent Application Publication (Translation of PCT Application) No. 2007-506243 discloses a technique such that a fuel cell system is provided with a combustor which causes hydrogen (fuel gas) to react with air (oxidant gas), and at the time of stopping the fuel cell, oxygen-consumed air (nitrogen gas) from the combustor is supplied to the cathode (oxidant gas passage) and the anode (fuel gas passage).

However, the fuel cell system disclosed in this publication needs the combustor, a valve (fuel inactivation valve) for supplying the fuel gas to the combustor, etc., complicating the system.

It is also known that when an anode gas is switched to a hydrogen gas from a nitrogen gas upon activation of a fuel cell, the cathode side partially comes to a high-potential state (see, for example, "New Development On Research On Batteries/Fuel Cells—Aiming At Achieving Low-Carbon Society—Efforts To Overcoming The Problems Of Approaching Practical Application Of Solid Polymer Electrolyte Fuel Cells", by Kazumi Tanimoto and Isao Nagai, AIST TODAY, Aug. 1, 2009, Vol. 9, No. 8, p. 12-13).

SUMMARY OF THE INVENTION

According to one aspect of the present invention, in a method for stopping an operation of a fuel cell system, supply of a fuel gas to an anode side of a fuel cell provided in the fuel cell system is stopped. A fuel exhaust gas discharged from the fuel cell is recirculated to the anode side of the fuel cell. An oxidant-exhaust-gas discharge path through which an oxidant exhaust gas is to be discharged from the fuel cell is sealed at a downstream position of a connecting portion at which the oxidant-exhaust-gas discharge path is connected to an oxidant-exhaust-gas recirculation path. The oxidant exhaust gas is recirculated to a cathode side of the fuel cell through the oxidant-exhaust-gas recirculation path. Recirculation of the fuel exhaust gas is stopped. Recirculation of the oxidant exhaust gas is stopped. An oxidant-gas supply path through which an oxidant gas is to be supplied to the fuel cell is sealed.

According to another aspect of the present invention, in a method for stopping an operation of a fuel cell system, supply of a fuel gas to an anode side of a fuel cell is stopped. A fuel exhaust gas discharged from the fuel cell is recirculated to the anode side of the fuel cell. An oxidant-gas supply path through which an oxidant gas is to be supplied to the fuel cell is sealed at an upstream position of a connecting portion at which the oxidant-gas supply path is connected to an oxidant-exhaust-gas recirculation path. An oxidant-exhaust-gas discharge path through which an oxidant exhaust gas is to be discharged from the fuel cell is sealed at a downstream position of a connecting portion at which the oxidant-exhaust-gas discharge path is connected to the oxidant-exhaust-gas recirculation path. The oxidant exhaust gas is recirculated to a cathode side of the fuel cell through the oxidant-exhaust-gas recirculation path. Recirculation of the fuel exhaust gas is stopped. Recirculation of the oxidant exhaust gas is stopped.

According to further aspect of the present invention, a fuel cell system includes a fuel cell, a fuel-gas supply path, a fuel-exhaust-gas discharge path, a fuel-exhaust-gas recirculation path, an oxidant-gas supply path, an oxidant-exhaust-gas discharge path, an oxidant-exhaust-gas recirculation path, a recirculation power generation device, and a sealing device. The fuel cell is to generate power using a fuel gas to be supplied to an anode side and an oxidant gas to be supplied to a cathode side. A fuel gas is to be supplied to the fuel cell through the fuel-gas supply path. A fuel exhaust gas is to be discharged from the fuel cell through the fuel-exhaust-gas discharge path. The fuel exhaust gas is to be recirculated to the anode side of the fuel cell through the fuel-exhaust-gas recirculation path. The oxidant gas is to be supplied to the fuel cell through the oxidant-gas supply path. An oxidant exhaust gas is to be discharged from the fuel cell through the oxidant-exhaust-gas discharge path. The oxidant exhaust gas is to be recirculated to the cathode side of the fuel cell through the oxidant-exhaust-gas recirculation path. The recirculation power generation device is configured, at a time of stopping the fuel cell, to stop supply of the fuel gas, to recirculate the fuel exhaust gas to the anode side of the fuel cell, to seal the oxidant-exhaust-gas discharge path, and to recirculate the oxidant exhaust gas to the cathode side of the fuel cell. The sealing device is configured to stop recirculation of the fuel exhaust gas, to stop recirculation of the oxidant exhaust gas, and to seal the cathode side of the fuel cell.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
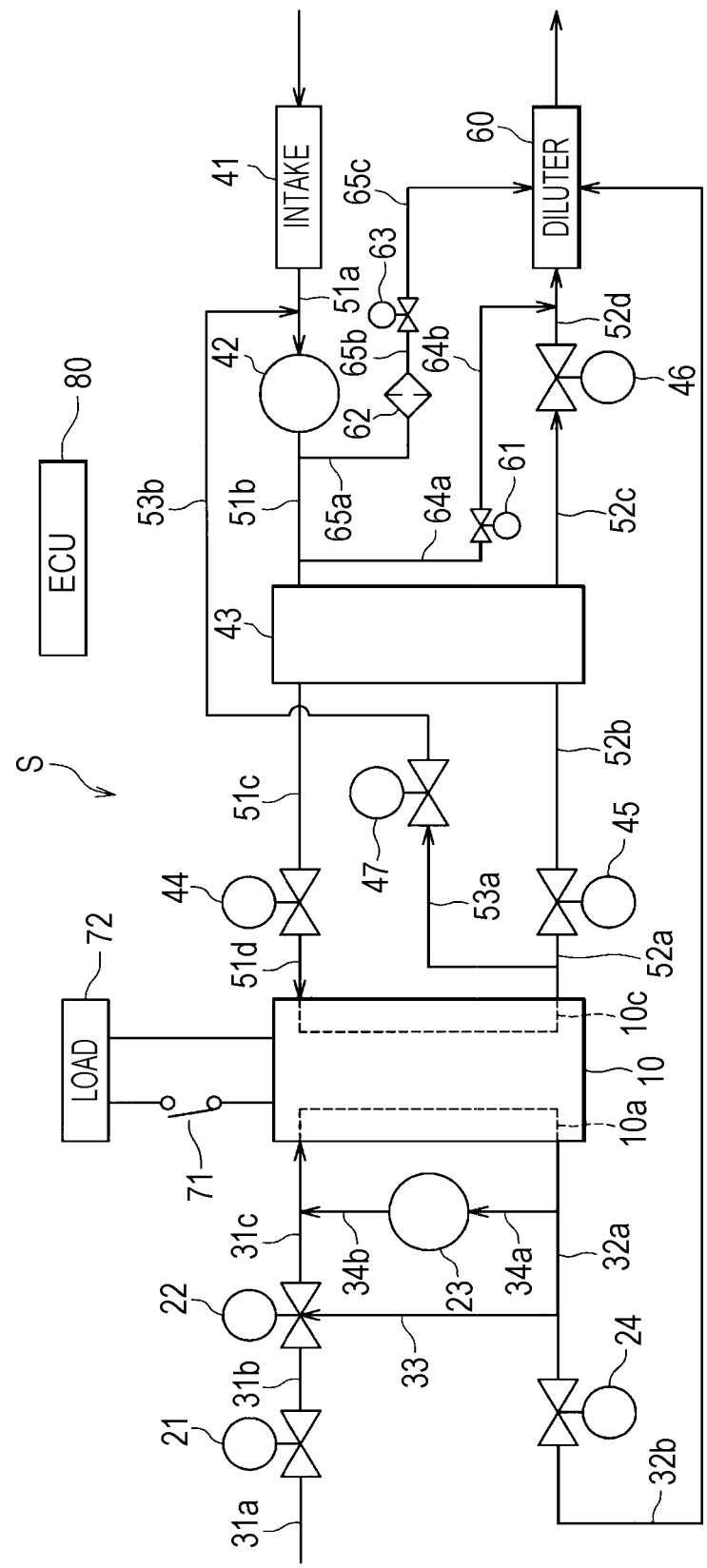
FIG. 1 is a configurational diagram of a fuel cell system according to a first embodiment.

The embodiments will now be described with reference to the accompanying drawings, wherein like reference numerals designate corresponding or identical elements throughout the various drawings.

To avoid the redundant description, same reference numerals are given to common components in the individual drawings.
Fuel Cell System According to First Embodiment To begin with, the configuration of a fuel cell system S on which an operation stopping method according to a first embodiment is performed will be described referring to FIG. 1.

The fuel cell system S shown in FIG. 1 is mounted in, for example, an unillustrated fuel cell vehicle (movable body).

The fuel cell system S includes a fuel cell stack 10 (fuel cells), an anode system that supplies and discharges hydrogen to and from the anode of the fuel cell stack 10, a cathode system that supplies and discharges air (oxidant gas) containing oxygen to and from the cathode of the fuel cell stack 10, a dilution exhaust system that discharges a fuel exhaust gas from the anode system and an oxidant exhaust gas from the cathode system out of the fuel cell system S, a power supply system that is connected to an output terminal (not shown) of the fuel cell stack 10 to supply power generated by the fuel cell stack 10 to a load, and an ECU (Electronic Control Unit) 80 which is a control unit to electronically control the previously-mentioned components. It is to be noted that the specific kinds of the fuel gas and oxidant gas are not limited to those mentioned above.
Fuel Cell Stack The fuel cell stack 10 has a stack of a plurality (e.g., several tens to several hundreds) of solid polymer electrolyte unit cells (fuel cells) connected in series to one another. The unit cell includes an MEA (Membrane Electrode Assembly) and two conductive separators sandwiching the MEA. The MEA includes an electrolyte membrane (solid polymer electrolyte membrane) having a monovalent cation exchange membrane or the like, and an anode and a cathode (electrodes) which sandwich the electrolyte membrane.

Each of the anode and the cathode includes a porous conductive substance such as carbon paper, and a catalyst (Pt, Ru or the like) that is carried thereon to cause the anode and the cathode to bring about an electrode reaction.

Each separator has a groove formed therein to supply hydrogen or air to the entire surface of each MEA, and a through hole formed therein to supply and discharge hydrogen or air to and from every unit cell. Those grooves and through holes serve as an anode passage 10a (fuel gas passage) and a cathode passage 10c (oxidant gas passage). Each of the anode passage 10a and the cathode passage 10c is branched to a plurality of passages which are merged in order to supply hydrogen or air to the entire surfaces of the unit cells, and has an extremely small flow cross-sectional area.

When hydrogen is supplied to each anode through the anode passage 10a, an electrode reaction expressed by the following equation (1), and when air is supplied to each cathode through the cathode passage 10c, an electrode reaction expressed by the following equation (2), thereby producing a potential difference (open circuit voltage) in each unit cell. When the fuel cell stack 10 is then electrically connected to a load 72 to be discussed later so as to acquire a current, the fuel cell stack 10 generates power.

$$2H_2 \rightarrow 4H^+ + 4e^- \tag{1}$$

$$O_2 + 4H^+ + 4e^- \rightarrow 2H_2O \tag{2}$$

When the fuel cell stack 10 generates power this way, moisture (vapor) is produced in the cathode, and an oxidant exhaust gas to be discharged from the cathode passage 10c has high humidity.
Anode System The anode system includes an unillustrated hydrogen tank, a shutoff valve 21, an ejector 22, a hydrogen pump 23, and an anode purge valve 24.

A fuel-gas supply path is formed to extend from the hydrogen tank (not shown) and connect to the inlet of the anode passage 10a via a pipe 31a, the shutoff valve 21, a pipe 31b, the ejector 22, and a pipe 31c. Hydrogen (fuel gas) in the hydrogen tank is supplied to the anode passage 10a through the fuel-gas supply path (pipe 31a, shutoff valve 21, pipe 31b, ejector 22, and pipe 31c).

The shutoff valve 21 is a normally-closed shutoff valve whose opening/closing is controlled by the ECU 80. The ECU 80 opens the shutoff valve 21 when the fuel cell system S is in operation (when the fuel cell stack 10 generates power).

The ejector 22 ejects hydrogen (fuel gas) from the hydrogen tank (not shown) from a nozzle to generate a negative pressure which causes suction of a fuel exhaust gas in a pipe 33. The opening/closing of the ejector 22 is controlled by the ECU 80.

The outlet of the anode passage 10a is connected to the inlet port of the via a pipe 32a and the pipe 33. The fuel exhaust gas discharged from the anode passage 10a passes through the pipe 32a and the pipe 33 and flows toward the ejector 22, so that the fuel exhaust gas (hydrogen) circulates.

The fuel exhaust gas contains hydrogen which has not been consumed in the electrode reaction in the anode, and vapor. The pipe 33 is provided with a gas-liquid separator (not shown) that separates and collects moisture (condensed water (liquid), vapor (gas)).

A pipe 34a branched from the pipe 32a connected to the outlet of the anode passage 10a is connected to the inlet port of the hydrogen pump 23 whose discharge port is connected to the pipe 31c via a pipe 34b, thereby forming a fuel-exhaust-gas recirculation path extending from the outlet of the anode passage 10a and connecting to the inlet of the anode passage 10a via the pipe 34a, the hydrogen pump 23, the pipe 34b and the pipe 31c.

The operation of the hydrogen pump 23 is controlled by the ECU 80, so that the fuel exhaust gas from the pipe 32a is compressed and supplied to the pipe 31c under pressure.

The pipe 32a is connected to a diluter 60 to be described later via the anode purge valve 24 and a pipe 32b, thereby forming a fuel-exhaust-gas discharge path.

The anode purge valve 24 is a normally-closed shutoff valve whose opening/closing is controlled by the ECU 80. The ECU 80 opens the anode purge valve 24 for a predetermined valve-open time when determining that the power generation of the fuel cell stack 10 is not stable.

Cathode System

The cathode system includes an intake 41, an air pump 42, a humidifier 43, an inlet sealing valve 44, an outlet sealing valve 45, a CPCV (Cathode Purge Control Valve) 46, and an EGR valve (Exhaust Gas Recirculation) 47.

An oxidant-gas supply path is formed to extend from the intake 41, which takes air inside, and connect to the inlet of the cathode passage 10c via a pipe 51a, the air pump 42h, a pipe 51b, the humidifier 43, a pipe 51c, the inlet sealing valve 44 and a pipe 51d. The air (oxidant gas) taken into from the intake 41 passes through the oxidant-gas supply path (pipe 51a, air pump 42, pipe 51b, humidifier 43, pipe 51c, inlet sealing valve 44 and pipe 51d) to be supplied to the cathode passage 10c.

The operation of the air pump 42 is controlled by the ECU 80 to compress air from the pipe 51a and feed the compressed air to the pipe 51b.

The humidifier 43 includes a plurality of hollow fiber membranes (not shown) having moisture permeability. The humidifier 43 performs moisture exchange on air flowing toward the cathode passage 10c (air flowing into the pipe 51d from the pipe 51c) and a humid oxidant exhaust gas discharged from the cathode passage 10c (oxidant exhaust gas flowing into a pipe 52c from a pipe 52b).

The opening/closing of the inlet sealing valve 44 is controlled by the ECU 80.

The outlet of the cathode passage 10c is connected to the diluter 60 to be described later via a pipe 52a, the outlet sealing valve 45, the pipe 52b, the humidifier 43, the pipe 52c, the CPCV 46, and a pipe 52d, thereby forming the oxidant-exhaust-gas discharge path.

The opening/closing of the outlet sealing valve 45 is controlled by the ECU 80.

The CPCV 46 includes, for example, a butterfly valve whose degree of opening is controlled by the ECU 80 to control the pressure of the air in the cathode passage 10c. Specifically, when the degree of opening of the CPCV 46 becomes smaller, the pressure of the air in the cathode passage 10c rises, thus increasing the oxygen concentration (volume concentration) per volume flow rate. When the degree of opening of the CPCV 46 becomes larger, on the other hand, the pressure of the air in the cathode passage 10c falls, thus lowering the oxygen concentration (volume concentration) per volume flow rate.

A pipe 53a branched from the pipe 52 connected to the outlet of the cathode passage 10c is connected to one end of the EGR valve 47 whose other end is connected to the pipe 51a via a pipe 53b, thereby forming an oxidant-exhaust-gas recirculation path. The oxidant-exhaust-gas recirculation path extends from the outlet of the cathode passage 10c and connects to the inlet of the cathode passage 10c via the pipe 52a, the pipe 53a, the EGR valve 47, the pipe 53b, the pipe 51a, the air pump 42, the pipe 51b, the humidifier 43, the pipe 51c, the inlet sealing valve 44 and the pipe 51d.

The EGR valve 47 is a normally-closed shutoff valve whose opening/closing is controlled by the ECU 80. The cathode passage 10c can be sealed by closing all of the inlet sealing valve 44, the outlet sealing valve 45 and the EGR valve 47.

Dilution Exhaust System

The dilution exhaust system includes the diluter 60, a bypass valve 61, an orifice 62, and an assist valve 63.

The pipe 51b connected to the discharge port of the air pump 42 forms a path connected to the diluter 60 via a pipe 64a, the bypass valve 61, a pipe 64b, and the pipe 52d. That is, air can bypass the cathode passage 10c of the fuel cell stack 10 to supply air to the diluter 60 from the air pump 42.

The pipe 51b connected to the discharge port of the air pump 42 forms a path connected to the diluter 60 via a pipe 65a, the orifice 62, a pipe 65b, the assist valve 63, and a pipe 65c.

The bypass valve 61 and the assist valve 63 are normally closed shutoff valves whose opening/closing is controlled by the ECU 80.

The diluter 60 is configured to be able to dilute the fuel exhaust gas from the pipe 32b of the fuel-exhaust-gas discharge path using the oxidant exhaust gas from the pipe 5d of the oxidant-exhaust-gas discharge path or the air supplied to the diluter 60 via the open bypass valve 61, and discharge the diluted gas. The air supplied to the diluter 60 via the open assist valve 63 generates an air stream inside the diluter 60 to accelerate the dilution (mixing) of the fuel exhaust gas and the oxidant exhaust gas (air).

Power Supply System

The power supply system, which is connected to the output terminal (not shown) of the fuel cell stack 10, includes a contactor 71 and supplies generated power from the fuel cell stack 10 to the load 72.

The contactor 71 is configured to be able to disconnect the output terminal (not shown) of the fuel cell stack 10 from the load 72, and is controlled by the ECU 80.

ECU

The ECU 80 is the control unit that electronically controls the fuel cell system S, and includes a CPU, ROM, RAM, various interfaces, and an electronic circuit. The ECU 80 demonstrates various capabilities fuel in accordance with a program stored therein to control various kinds of components, such as the shutoff valve 21, the ejector 22, the hydrogen pump 23, the anode purge valve 24, the air pump 42, the inlet sealing valve 44, the outlet sealing valve 45, the CPCV 46, the EGR valve 47, the bypass valve 61, the assist valve 63, and the contactor 71.

The fuel cell system S is provided with various sensors whose detection signals are sent to the ECU 80.

Operation Stopping Routine for Fuel Cell System According to First Embodiment

Figure 2:
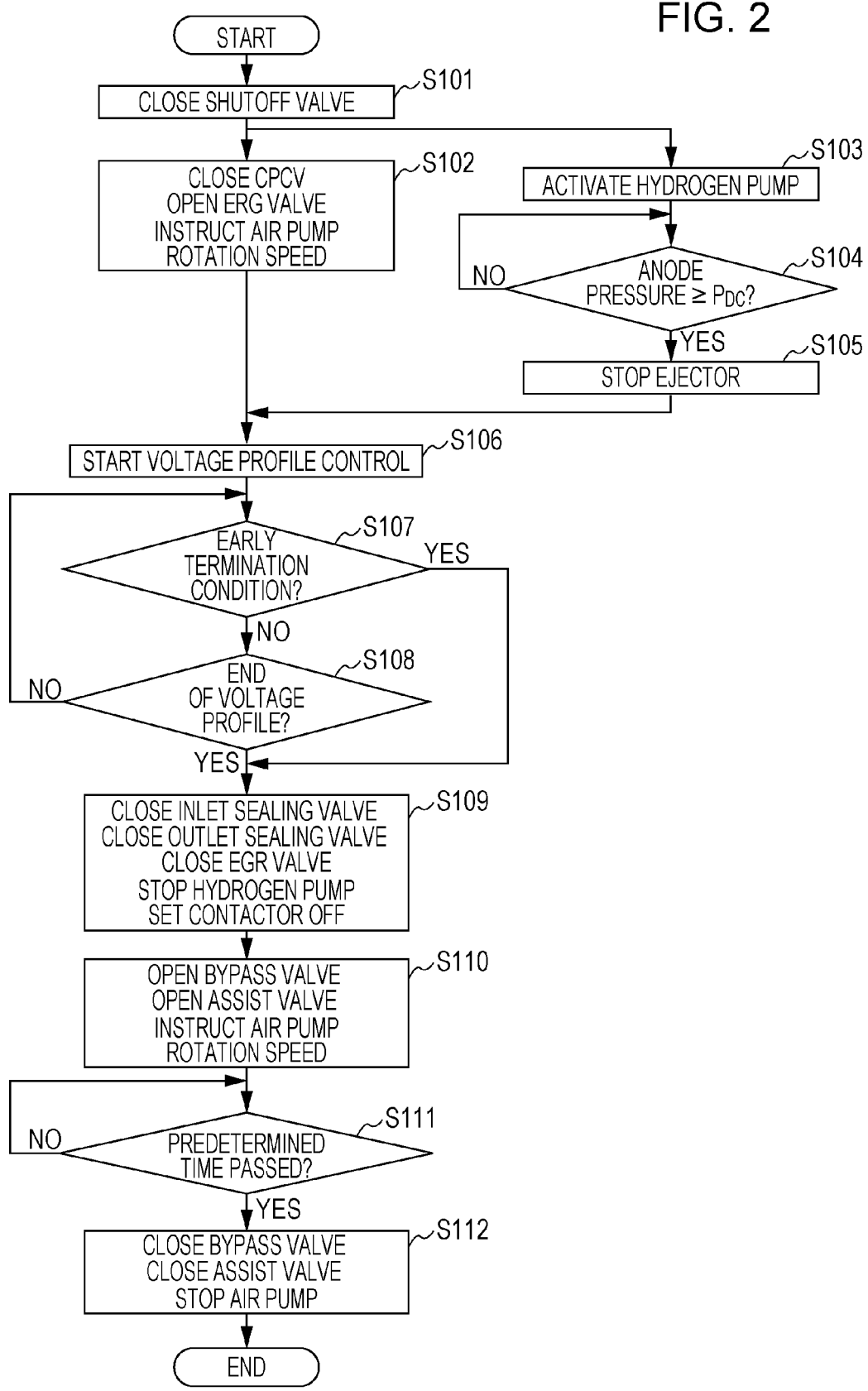
FIG. 2 is a flowchart illustrating an operation stopping routine for the fuel cell system according to the first embodiment.
Figure 3:
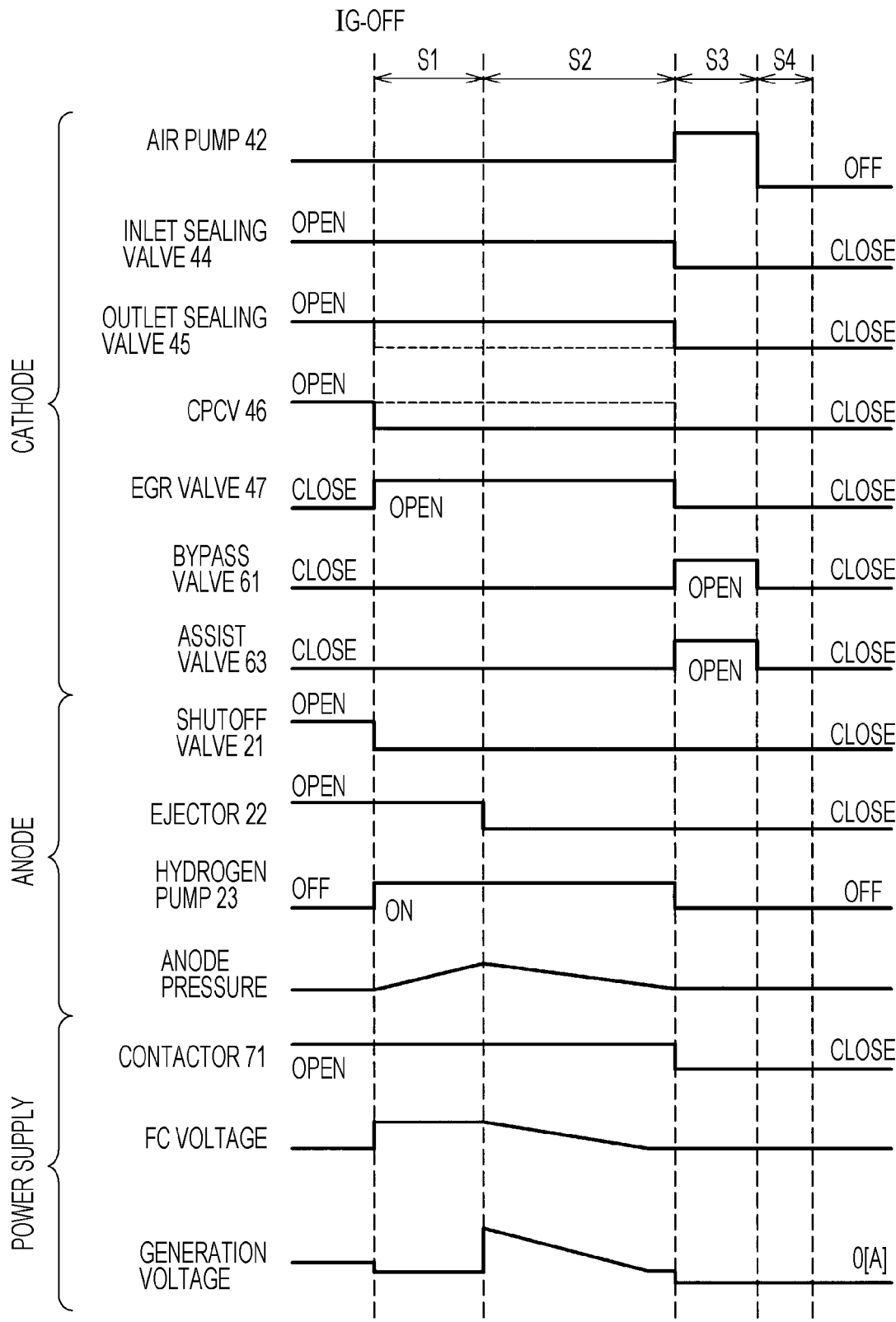
FIG. 3 is a time chart illustrating the operation stopping routine for the fuel cell system according to the first embodiment.

Next, an operation stopping routine for the fuel cell system S according to the first embodiment will be described referring to FIGS. 2 and 3. FIG. 2 is a flowchart illustrating the operation stopping routine for the fuel cell system S according to the first embodiment. FIG. 3 is a time chart illustrating the operation stopping routine for the fuel cell system S according to the first embodiment.

The operation stopping routine is carried out in the order of an EGR preparation step S1 (steps S101 to S105 in FIG. 2), an EGR discharge step S2 (steps S106 to S109 in FIG. 2), a diluter purging step S3 (steps S110 and S111 in FIG. 2), and a stopping step S4 (step S112 in FIG. 2).

In the EGR preparation step S1, the oxidant-exhaust-gas recirculation path is formed, the pressure in the anode passage 10a (anode pressure) of the fuel cell stack 10 is raised to a predetermined pressure (pressure $P_{DC}$) beforehand in order to keep the amount of hydrogen to be consumed in the subsequent EGR discharge step S2 and the amount of hydrogen held in the anode passage 10a after the operation is stopped.

In the EGR discharge step S2, the cathode passage 10c is sealed after power generation is executed with an oxidant exhaust gas circulating in the cathode passage 10c of the fuel cell stack 10.

The diluter purging step S3 dilutes and purges the fuel exhaust gas in the diluter 60.

In the stopping step S4, the operation stopping routine for the fuel cell system S is completed to stop the fuel cell system S.

The operation stopping routine that is executed by the ECU 80 will be described using FIG. 2 with reference to FIG. 3. Upon detection of a stop instruction (IG-OFF) for the fuel cell system S, the ECU 80 starts the operation stopping routine illustrated in FIG. 2.

In step S101, the ECU 80 closes the shutoff valve 21. It is assumed that the anode purge valve 24 is closed.

Note that although the shutoff valve 21 is closed, the anode pressure is raised by the remaining pressure between the shutoff valve 21 to the ejector 22.

Then, the process of the ECU 80 proceeds to steps S102 and S103.

In step S102, the ECU 80 closes (fully closes) the CPCV 46, and opens the EGR valve 47 to control the rotation speed of the air pump 42 to a predetermined rotation speed.

As a result, the oxidant-exhaust-gas recirculation path is formed which extends from the outlet of the cathode passage 10c and connects to the inlet of the cathode passage 10c via the pipe 52a, the pipe 53a, the EGR valve 47, the pipe 53b, the pipe 51a, the air pump 42, the pipe 51b, the humidifier 43, the pipe 51c, the inlet sealing valve 44, and the pipe 51d.

The rotation speed of the air pump 42 is controlled in the subsequent EGR discharge step S2 in such a way that the rotation speed becomes equal to or greater than a predetermined flow rate which can permit a fluid to evenly flow into the surface of the cathode passage 10c of the fuel cell stack 10 and in the stacking direction. Note that the predetermined flow rate is determined beforehand empirically or so.

In step S103, the ECU 80 drives the hydrogen pump 23 at a predetermined rotation speed.

As a result, water in the anode passage 10a of the fuel cell stack 10 can be discharged, and hydrogen can evenly flow to the anode surface of the electrolyte membrane.

In step S104, the ECU 80 determines whether the pressure in the anode passage 10a (anode pressure) of the fuel cell stack 10 is equal to or higher than the predetermined pressure $P_{DC}$. The pressure $P_{DC}$ is a threshold value based on which it is determined whether or not to initiate the EGR discharge step S2 to be described later.

When the anode pressure is not equal to or higher than the predetermined pressure $P_{DC}$ (S104: No), the ECU 80 repeats step S104. When the anode pressure is equal to or higher than the predetermined pressure $P_{DC}$ (S104: Yes), the ECU 80 proceeds to step S105.

In step S105, the ECU 80 stops (closes) the ejector 22.

The EGR preparation step S1 will be summed up below referring to FIG. 3.

Upon detection of the stop instruction (IG-OFF), the ECU 80 closes the shutoff valve 21, but the remaining pressure between the shutoff valve 21 to the ejector 22 causes hydrogen to be supplied to the anode passage 10a of the fuel cell stack 10 from the ejector 22, raising the anode pressure. When the anode pressure becomes equal to or higher than the predetermined pressure $P_{DC}$, the ECU 80 stops (closes) the ejector 22 to stop supplying hydrogen.

To prepare for the subsequent EGR discharge step S2, the ECU 80 closes the CPCV 46 to shut off the oxidant-exhaust-gas discharge path, opens the EGR valve 47 to form the oxidant-exhaust-gas recirculation path, and drives the hydrogen pump 23 and the air pump 42 at predetermined rotation speeds.

Returning to FIG. 2, when the processes of steps S102 and S105 are finished, the ECU 80 proceeds to step S106.

In step S106, the ECU 80 controls generation voltage in such a way that the fuel cell stack 10 generates power according to a predetermined voltage profile. To suppress impairment of the catalyst, it is preferable that the generation current of the fuel cell stack 10 becomes less than a predetermined maximum generation current. It is also preferable that the variation width of the generation voltage of the fuel cell stack 10 becomes less than a predetermined maximum variation width. The power generated by the fuel cell stack 10 is supplied to the load 72.

The voltage control according to the voltage profile is implemented in such a way that, for example, the generation voltage is kept at a constant voltage (e.g., 200 V), and is terminated when a predetermined time elapses from the point when the generation current becomes equal to or less than a predetermined threshold value. The predetermined time is long enough for oxygen in the cathode passage 10c to be substantially consumed, and is determined beforehand empirically or so.

In step S107, the ECU 80 determines whether early termination conditions are fulfilled or not. The early termination conditions are the conditions that are set for determining termination of the EGR discharge step S2 before the voltage profile control set in step S106 is terminated.

In the EGR discharge step S2, as shown in FIG. 3, hydrogen in the fuel exhaust gas that circulates in the anode passage 10a and the fuel-exhaust-gas recirculation path is consumed, thereby lowering the anode pressure. When the anode pressure drops too much, fuel shortage may occur on the anode side, raising the anode potential, which may impair the catalyst.

In this respect, the ECU 80 monitors the anode pressure, and determines that an early termination condition is fulfilled when the anode pressure becomes lower than the predetermined pressure.

When the cell voltage of the fuel cell stack 10 (fuel cell) becomes lower than a predetermined value, fuel shortage may have occurred on the anode side. When fuel shortage occurs on the anode side, the anode potential rises, which may impair the catalyst.

In this respect, the ECU 80 monitors the cell voltage of the fuel cell stack 10 (fuel cell), and determines that an early termination condition is fulfilled when the cell voltage becomes lower than the predetermined value.

When the total voltage (voltage of the fuel cell stack 10) becomes lower than a predetermined voltage (e.g., predetermined voltage specified in the voltage profile control), it is considered that oxygen in the cathode passage 10c has been consumed substantially.

In this respect, the ECU 80 monitors the total voltage of the fuel cell stack 10, and determines that an early termination condition is fulfilled when the total voltage becomes lower than the predetermined value.

When none of the early termination conditions are fulfilled (S107: No), the ECU 80 proceeds to step S108. When at least one of the early termination conditions is fulfilled (S107: Yes), the ECU 80 proceeds to step S109.

The ECU 80 determines in step S108 whether the predetermined voltage profile is terminated.

When the predetermined voltage profile is not terminated (S108: No), the ECU 80 returns to step S107. When the predetermined voltage profile is terminated (S108: Yes), the ECU 80 proceeds to step S109.

In step S109, the ECU 80 closes the inlet sealing valve 44, the outlet sealing valve 45, and the EGR valve 47, stops the hydrogen pump 23, and sets off (disconnects) the contactor 71.

As a result, the connection between the fuel cell stack 10 and the load 72 is disconnected, so that the cathode passage 10c of the fuel cell stack 10 is sealed.

Referring to FIG. 3, the EGR discharge step S2 will be summed up.

The ECU 80 drives the hydrogen pump 23 to recirculate the fuel exhaust gas in the fuel-exhaust-gas recirculation path and the anode passage 10a, drives the air pump 42 to recirculate the oxidant exhaust gas in the oxidant-exhaust-gas recirculation path and the cathode passage 10c, and causes the fuel cell stack 10 to generate power, thereby consuming oxygen in the recirculating oxidant exhaust gas. When it is determined that oxygen is consumed substantially (the end of the voltage profile), the ECU 80 closes the inlet sealing valve 44 and the outlet sealing valve 45 to seal the cathode passage 10c in which air (nitrogen environment) whose oxygen has been consumed substantially is occluded. Further, because power generation of the fuel cell stack 10 is terminated, the ECU 80 stops the hydrogen pump 23, and the sets off (disconnects) the contactor 71.

Returning to FIG. 2, the ECU 80 opens the bypass valve 61 and the assist valve 63, and instructs the rotation speed of the air pump 42 (rotation speed for purging) in step S110.

In step S111, the ECU 80 determines whether a predetermined time has elapsed since the execution of step S110 (since the initiation of the diluter purging step S3).

When the predetermined time has not been elapsed (S111: No), the ECU 80 repeats step S111. When the predetermined time has been elapsed (S111: Yes), the ECU 80 proceeds to step S112.

Referring to FIG. 3, the diluter purging step S3 will be summed up.

The ECU 80 opens the bypass valve 61 and the assist valve 63 to supply air (oxidant gas) to the diluter 60 to purge the interior of the diluter 60. When a predetermined time elapses, the ECU 80 determines that purging is completed, and proceeds to the subsequent stopping step S4.

Returning to FIG. 2, the ECU 80 closes the bypass valve 61 and the assist valve 63, and stops the air pump 42 in step S112.

Through the foregoing operation stopping routine, the fuel cell system S is stopped with the gas containing hydrogen (fuel gas) being occluded in the anode passage 10a of the fuel cell stack 10, and the air (nitrogen environment) whose oxygen has been consumed in the EGR discharge step S2 being occluded in the cathode passage 10c of the fuel cell stack 10.

When the halt period of the fuel cell system S becomes long, part of the hydrogen in the anode passage 10a penetrates toward the cathode passage 10c, but the gas in the cathode passage 10c is the oxygen-consumed air (nitrogen environment), so that a chemical reaction hardly occurs, thus making it possible to suppress impairment of the catalyst and the catalyst support, thereby repressing shortening of the service life of the fuel cell.

In addition, oxygen is consumed by power generation while causing the oxidant exhaust gas to circulate in the cathode passage 10c and the oxidant-exhaust-gas recirculation path by means of the air pump 42 in the EGR discharge step S2, thereby ensuring uniform reduction of the oxygen concentration. Accordingly, oxygen in the gas from the inlet sealing valve 44 to the inlet of the cathode passage 10c, and oxygen in the gas from the outlet sealing valve 45 to the outlet of the cathode passage 10c can be reduced, thereby making it possible to uniformly reducing oxygen in the sealing area at the time the cathode passage 10c is sealed.

Because the fuel exhaust gas is circulated in the anode passage 10a and the fuel-exhaust-gas recirculation path by the hydrogen pump 23 in the EGR discharge step S2, it is possible to prevent local fuel shortage on the anode side, and suppress impairment of the catalyst on the anode side.

According to the operation stopping method described in Japanese Unexamined Patent Application Publication (Translation of PCT Application) No. 2007-506243, the entire contents of which are incorporated herein by reference, upon activation of the fuel cell system S, a nitrogen gas (oxygen-consumed air) is occluded in the anode passage, so that the catalyst may be impaired by the high cathode potential as described in "New Development On Research On Batteries/Fuel Cells—Aiming At Achieving Low-Carbon Society—Efforts To Overcoming The Problems Of Approaching Practical Application Of Solid Polymer Electrolyte Fuel Cells", by Kazumi Tanimoto and Isao Nagai, AIST TODAY, Aug. 1, 2009, Vol. 9, No. 8, p. 12-13, the entire contents of which are likewise incorporated herein by reference.

According to the first embodiment, by way of contrast, hydrogen (fuel gas) is present in the anode passage 10a of the fuel cell stack 10, and the high cathode potential is not generated upon activation of the fuel cell system S, thereby making it possible to suppress impairment of the catalyst.

Fuel Cell System According to Second Embodiment

Next, the configuration of a fuel cell system SA on which an operation stopping method according to a second embodiment is performed will be described referring to FIG. 4.

Figure 4:
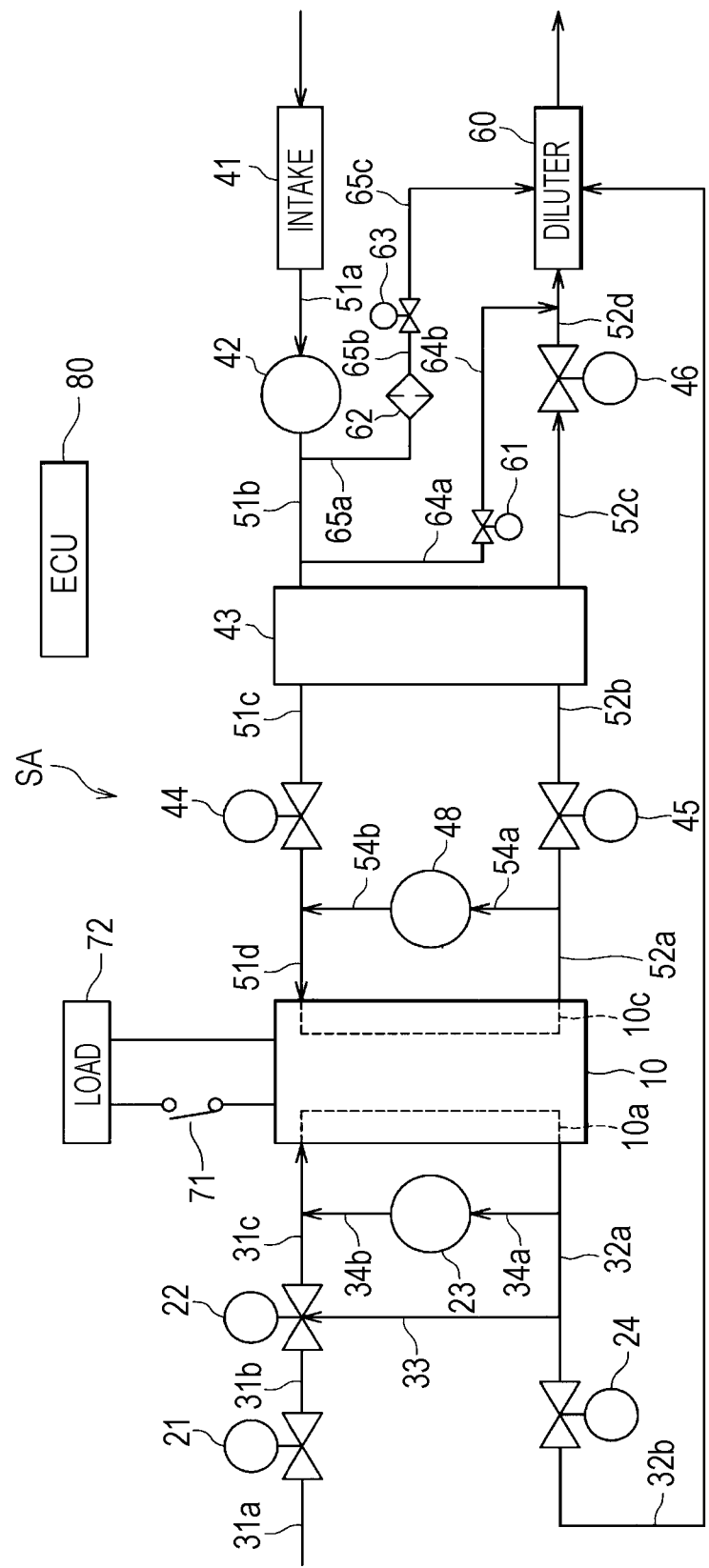
FIG. 4 is a configurational diagram of a fuel cell system according to a second embodiment of the disclosure.

The fuel cell system SA shown in FIG. 4 is mounted in, for example, an unillustrated fuel cell vehicle (movable body).

The fuel cell system SA (see FIG. 4) according to the second embodiment differs from the fuel cell system S (see FIG. 1) according to the first embodiment in the configuration of the oxidant-exhaust-gas recirculation path formed in the cathode system that supplies and discharges oxygen-containing air (oxidant gas) to and from the cathode of the fuel cell stack 10. Specifically, the fuel cell system SA includes a cathode circulation pump 48 and pipes 54a, 54b in place of the EGR valve 47 and the pipes 53a, 53b of the fuel cell system S (see FIG. 1).

Because the other configuration of the fuel cell system SA is the same as that of the fuel cell system S (see FIG. 1), its description is omitted.

The pipe 54a branched from the pipe 52a connected to the outlet of the cathode passage 10c is connected to the inlet port of the cathode circulation pump 48 whose discharge port is connected to the pipe 51d via the pipe 54b, thus forming an oxidant-exhaust-gas recirculation path which extends from the outlet of the cathode passage 10c and connecting to the inlet of the cathode passage 10c via the pipe 52a, the pipe 54a, the cathode circulation pump 48, the pipe 54b and the pipe 51d.

The operation of the cathode circulation pump 48 is controlled by the ECU 80 to compress the oxidant exhaust gas from the pipe 52a and feed the compressed gas to the pipe 51d.

Operation Stopping Routine for Fuel Cell System According to Second Embodiment

Figure 5:
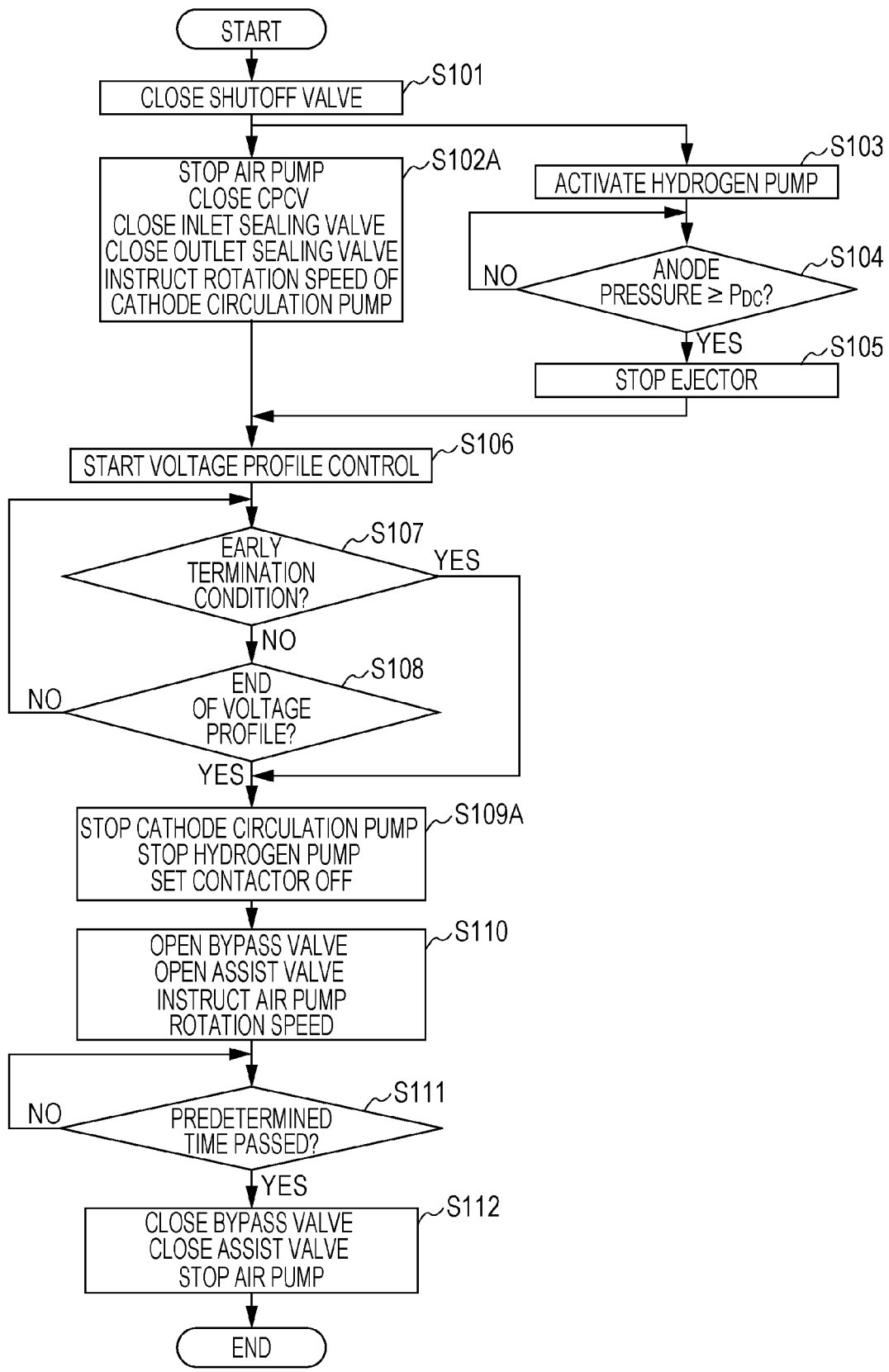
FIG. 5 is a flowchart illustrating an operation stopping routine for the fuel cell system according to the second embodiment.
Figure 6:
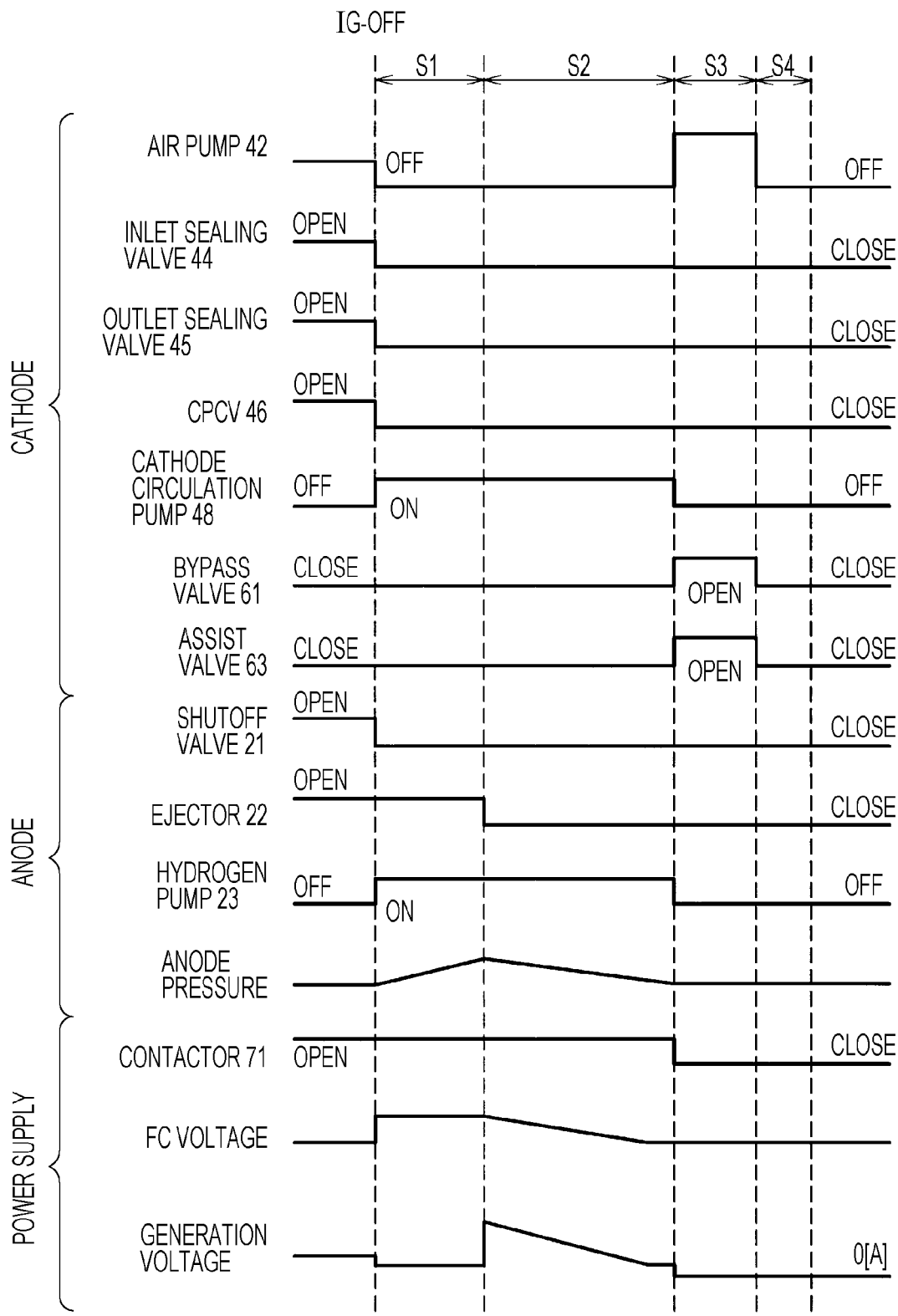
FIG. 6 is a time chart illustrating the operation stopping routine for the fuel cell system according to the second embodiment.

Next, an operation stopping routine for the fuel cell system SA according to the second embodiment will be described referring to FIGS. 5 and 6. FIG. 5 is a flowchart illustrating the operation stopping routine for the fuel cell system SA according to the second embodiment. FIG. 6 is a time chart illustrating the operation stopping routine for the fuel cell system SA according to the second embodiment.

The operation stopping routine (see FIGS. 5 and 6) for the fuel cell system SA according to the second embodiment differs from the operation stopping routine (see FIGS. 2 and 3) for the fuel cell system S according to the first embodiment in that steps S102 and S109 are changed to steps S102A and S109A.

Because the other steps of the operation stopping routine for the fuel cell system SA are the same as those of the operation stopping routine for the fuel cell system S (see FIGS. 2 and 3), their descriptions are omitted.

After step S101, the ECU 80 proceeds to steps S102A and S103.

In step S102A, the ECU 80 stops the air pump 42, closes (fully closes) the CPCV 46, opens the inlet sealing valve 44 and the outlet sealing valve 45, and controls the rotation speed of the cathode circulation pump 48 to a predetermined rotation speed.

As a result, the cathode passage 10c of the fuel cell stack 10 is shut off from the outside (outside air), and the oxidant-exhaust-gas recirculation path extending from the outlet of the cathode passage 10c and connecting to the inlet of the cathode passage 10c via the pipe 54a, the cathode circulation pump 48, the pipe 54b, and the pipe 51d is formed to permit the oxidant exhaust gas to circulate in the oxidant-exhaust-gas recirculation path.

When the processes of steps S102A and S105 are terminated, the ECU 80 proceeds to step S106.

When at least one early termination condition is fulfilled (S107: Yes) or when the predetermined voltage profile is terminated (S108: Yes), the ECU 80 proceeds to step S109A.

In step S109, the ECU 80 stops the cathode circulation pump 48, stops the hydrogen pump 23, and sets off (disconnects) the contactor 71.

As a result, the connection between the fuel cell stack 10 and the load 72 is disconnected.

Then, the ECU 80 proceeds to step S110.

Through the foregoing operation stopping routine, the fuel cell system SA is stopped with the gas containing hydrogen (fuel gas) being occluded in the anode passage 10a of the fuel cell stack 10, and the air (nitrogen environment) whose oxygen has been consumed in the EGR discharge step S2 being occluded in the cathode passage 10c of the fuel cell stack 10, providing same operations and effects as provided by the fuel cell system S according to the first embodiment.

In addition, the fuel cell system SA according to the second embodiment closes the inlet sealing valve 44 and the outlet sealing valve 45 (see step S102A) to shut off the cathode passage 10c of the fuel cell stack 10 from the outside (outside air), and then oxygen is consumed in the EGR discharge step S2. This makes it possible to prevent the outside air from flowing inside, thus ensure more reliable consumption of oxygen.

Further, the fuel cell system SA according to the second embodiment can make the oxidant-exhaust-gas recirculation path shorter, so that the amount of the recirculating oxidant exhaust gas can be reduced. That is, the time needed for the EGR discharge step S2 to consume oxygen in the recirculating oxidant exhaust gas can be shortened.

Modifications

The configurations of the fuel cell systems (S and SA) according to the embodiments (first embodiment and second embodiment) are not limited to those described above, and may be modified in various forms without departing from the scope and spirit of the disclosure.

Although the foregoing description of the first embodiment has been given of the case where the CPCV 46 is closed with the outlet sealing valve 45 open in step S102 for the fuel cell system S according to the first embodiment, this is not restrictive. For example, the fuel cell system may be configured in such a way that the outlet sealing valve 45 is closed with the CPCV 46 open (see dashed lines of the outlet sealing valve 45 and the CPCV 46 in the time chart shown in FIG. 3), thereby forming the oxidant-exhaust-gas discharge path.

Although the foregoing description of the second embodiment has been given of the case where the air pump 42 is stopped in step S102A for the fuel cell system SA according to the second embodiment (air pump 42 is stopped in the EGR preparation step S1 and the EGR discharge step S2), this is not restrictive. For example, the fuel cell system may be configured in such a way that the air pump 42 is operated with the bypass valve 61 and/or the assist valve 63 being open in the EGR and the EGR discharge step S2 preparation step S1. The power that is generated in the EGR discharge step S2 may be supplied to the air pump 42 (i.e., the air pump 42 is used as the load 72).

Although the foregoing descriptions of the embodiments have been given of the case where the power generated by the fuel cell stack 10 in the EGR discharge step S2 is supplied to the load 72, this is not restrictive. For example, the power generated by the fuel cell stack 10 may be supplied to a secondary battery (not shown).

According to a first aspect of an exemplary embodiment, there is provided an operation stopping method for a fuel cell system including a fuel cell that generates power based on an electrochemical reaction of a fuel gas to be supplied to an anode side with an oxidant gas to be supplied to a cathode side, a fuel-gas supply path and a fuel-gas supply device that supply the fuel gas to the fuel cell, a fuel-exhaust-gas discharge path that discharges a fuel exhaust gas from the fuel cell, a fuel-exhaust-gas recirculation path that recirculates the fuel exhaust gas to the anode side of the fuel cell, a fuel-exhaust-gas recirculation device that controls an operational state of the fuel-exhaust-gas recirculation path, an oxidant-gas supply path that supplies the oxidant gas to the fuel cell, an oxidant-exhaust-gas discharge path that discharges an oxidant exhaust gas from the fuel cell, an oxidant-exhaust-gas recirculation path that recirculates the oxidant exhaust gas to the cathode side of the fuel cell, an oxidant-exhaust-gas recirculation path controller that controls an operational state of the oxidant-exhaust-gas recirculation path, an oxidant-gas supply path sealing device that seals the oxidant-gas supply path, and an oxidant-exhaust-gas discharge path sealing device that seals a downstream portion of a connecting portion of the oxidant-exhaust-gas discharge path to the oxidant-exhaust-gas recirculation path, the method including a first step of, at a time of stopping the fuel cell system, stopping supply of the fuel gas, activating the fuel-exhaust-gas recirculation device to recirculate the fuel exhaust gas to the anode side of the fuel cell, causing the oxidant-exhaust-gas discharge path sealing device to seal the oxidant-exhaust-gas discharge path, causing the oxidant-exhaust-gas recirculation path controller to activate the oxidant-exhaust-gas recirculation path to recirculate the oxidant exhaust gas to the cathode side of the fuel cell, and causing the fuel cell to generate power, and a second step of stopping recirculation of the fuel exhaust gas by the fuel-exhaust-gas recirculation device, stopping recirculation of the oxidant exhaust gas by the oxidant-exhaust-gas recirculation path controller, stopping power generation of the fuel cell, and causing the oxidant-gas supply path sealing device to seal the oxidant-gas supply path.

According to this configuration of the exemplary embodiment, the fuel cell system can be stopped with the fuel gas being occluded in the anode side of the fuel cell, and the oxygen-consumed oxidant exhaust gas being occluded in the cathode side of the fuel cell. Even when the halt period of the fuel cell becomes long, therefore, impairment of the electrode catalyst and the catalyst support can be suppressed. At the time the fuel cell is activated, the fuel gas is present on the anode side, so that the high cathode potential is not generated upon activation of the fuel cell system, making it possible to suppress impairment of the catalyst. Note that "at the time of stopping the fuel cell" is, for example, when an instruction to stop the fuel cell system is detected.

According to a second aspect of the exemplary embodiment, there is provided an operation stopping method for a fuel cell system including a fuel cell that generates power based on an electrochemical reaction of a fuel gas to be supplied to an anode side with an oxidant gas to be supplied to a cathode side, a fuel-gas supply path and a fuel-gas supply device that supply the fuel gas to the fuel cell, a fuel-exhaust-gas discharge path that discharges a fuel exhaust gas from the fuel cell, a fuel-exhaust-gas recirculation path that recirculates the fuel exhaust gas to the anode side of the fuel cell, a fuel-exhaust-gas recirculation device that controls an operational state of the fuel-exhaust-gas recirculation path, an oxidant-gas supply path that supplies the oxidant gas to the fuel cell, an oxidant-exhaust-gas discharge path that discharges an oxidant exhaust gas from the fuel cell, an oxidant-exhaust-gas recirculation path that recirculates the oxidant exhaust gas to the cathode side of the fuel cell, an oxidant-exhaust-gas recirculation path controller that controls an operational state of the oxidant-exhaust-gas recirculation path, an oxidant-gas supply path sealing device that seals an upstream portion of a connecting portion of the oxidant-gas supply path to the oxidant-exhaust-gas recirculation path, and an oxidant-exhaust-gas discharge path sealing device that seals a downstream portion of a connecting portion of the oxidant-exhaust-gas discharge path to the oxidant-exhaust-gas recirculation path, the method including a first step of, at a time of stopping the fuel cell system, stopping supply of the fuel gas, activating the fuel-exhaust-gas recirculation device to recirculate the fuel exhaust gas to the anode side of the fuel cell, causing the oxidant-gas supply path sealing device to seal the oxidant-gas supply path, causing the oxidant-exhaust-gas discharge path sealing device to seal the oxidant-exhaust-gas discharge path, causing the oxidant-exhaust-gas recirculation path controller to activate the oxidant-exhaust-gas recirculation path to recirculate the oxidant exhaust gas to the cathode side of the fuel cell, and causing the fuel cell to generate power, and a second step of stopping recirculation of the fuel exhaust gas by the fuel-exhaust-gas recirculation device, stopping recirculation of the oxidant exhaust gas by the oxidant-exhaust-gas recirculation path controller, and stopping power generation of the fuel cell.

According to this configuration of the exemplary embodiment, the fuel cell system can be stopped with the fuel gas being occluded in the anode side of the fuel cell, and the oxygen-consumed oxidant exhaust gas being occluded in the cathode side of the fuel cell. Even when the halt period of the fuel cell becomes long, therefore, impairment of the electrode catalyst and the catalyst support can be suppressed. At the time the fuel cell is activated, the fuel gas is present on the anode side, so that the high cathode potential is not generated upon activation of the fuel cell system, making it possible to suppress impairment of the catalyst. In addition, oxygen in the oxidant exhaust gas is consumed while recirculating the oxidant exhaust gas with the oxidant-gas supply path and the oxidant-exhaust-gas discharge path respectively sealed by the oxidant-gas supply path sealing device and the oxidant-exhaust-gas discharge path sealing device, thus making it possible to ensure more reliable consumption of oxygen.

According to the first aspect or the second aspect of the exemplary embodiment, it is preferable that when it is determined that the oxidant gas remaining on the cathode side of the fuel cell is consumed in the first step, the first step should be terminated, and the second step should be implemented.

According to this configuration of the exemplary embodiment, even when the halt period of the fuel cell becomes longer due to reduction of the amount of oxygen on the sealed cathode side of the fuel cell, it is possible to suppress impairment of the electrode catalyst and the catalyst support.

According to the first aspect or the second aspect of the exemplary embodiment, it is preferable that when an anode pressure which is a pressure on the anode side of the fuel cell becomes less than a predetermined value, the first step should be terminated, and the second step should be implemented.

The reduction in anode pressure may cause shortage of the fuel in the anode, which raises the anode potential to impair the catalyst of the fuel cell. According to the above configuration, however, when the anode pressure becomes less than the predetermined value, the first step is terminated and power generation of the fuel cell is stopped, thereby making it possible to suppress impairment of the catalyst of the fuel cell.

According to the first aspect or the second aspect of the exemplary embodiment, it is preferable that when a cell voltage of the fuel cell becomes less than a predetermined value, the first step should be terminated, and the second step should be implemented.

According to this configuration of the exemplary embodiment, possible occurrence of fuel shortage in the anode is detected by monitoring the cell voltage, so that fuel shortage in the anode can be suppressed, thus repressing impairment of the catalyst of the fuel cell.

According to the first aspect or the second aspect of the exemplary embodiment, it is preferable that when a total voltage of the fuel cell becomes less than a predetermined value, the first step should be terminated, and the second step should be implemented.

According to this configuration of the exemplary embodiment, substantial consumption of oxygen in the recirculating oxidant exhaust gas can be detected by the event that the total voltage of the fuel cell becomes less than the predetermined value, after which the second step is carried out. Accordingly, the fuel cell system can be stopped with the oxygen-substantially-consumed oxidant exhaust gas being occluded on the cathode side of the fuel cell.

According to the first aspect or the second aspect of the exemplary embodiment, it is preferable to execute voltage control for controlling a generation voltage of the fuel cell at a time of causing the fuel cell to generate power in the first step.

According to the first aspect or the second aspect of the exemplary embodiment, it is preferable to execute the voltage control in such a way that a generation current of the fuel cell becomes less than a predetermined maximum generation current.

According to the first aspect or the second aspect of the exemplary embodiment, it is preferable to execute the voltage control in such a way that a variation width of the generation voltage of the fuel cell becomes less than a predetermined maximum variation width.

Such configuration of the exemplary embodiment can suppress an increase in the anode potential, thereby repressing impairment of the catalyst of the fuel cell.

According to the first aspect or the second aspect of the exemplary embodiment, it is preferable to execute the voltage control in such a way that the generation voltage of the fuel cell is held at a constant voltage for a predetermined time.

This configuration of the exemplary embodiment can efficiently reduce the concentration of oxygen in the oxidant exhaust gas that efficiently recirculates.

According to the first aspect or the second aspect of the exemplary embodiment, it is preferable that when a predetermined time elapses since a generation current of the fuel cell has become less than a predetermined threshold value at the time of executing the voltage control, the first step should be terminated, and the second step should be implemented.

This configuration of the exemplary embodiment can ensure substantial consumption of oxygen in the oxidant exhaust gas that recirculates, so that the fuel cell system can be stopped with the oxygen-substantially-consumed oxidant exhaust gas being occluded on the cathode side of the fuel cell.

According to the first aspect or the second aspect of the exemplary embodiment, it is preferable that in the first step, the oxidant-exhaust-gas recirculation path controller should recirculate the oxidant exhaust gas to the cathode side of the fuel cell.

This configuration of the exemplary embodiment can permit a fluid to evenly flow into the surface of the fuel cell and in the stacking direction, so that local rising of the potential can be suppressed, thereby making it possible to suppress impairment of the catalyst of the fuel cell.

According to the first aspect or the second aspect of the exemplary embodiment, it is preferable that the fuel cell system should further include a diluter connected to the fuel-exhaust-gas discharge path and the oxidant-exhaust-gas discharge path, a bypass path that supplies the oxidant gas to the diluter from the oxidant-gas supply path, and a bypass-path controller that controls an operational state of the bypass path, and the operation stopping method should further include a purging step of activating the bypass-path controller to supply the oxidant gas to the diluter for purging thereof.

This configuration of the exemplary embodiment can purge the diluter with the cathode side of the fuel cell being sealed, and terminate the operation stopping method for the fuel cell system.

According to a third aspect of the exemplary embodiment, there is provided a fuel cell system including a fuel cell that generates power based on an electrochemical reaction of a fuel gas to be supplied to an anode side with an oxidant gas to be supplied to a cathode side, a fuel-gas supply path that supplies the fuel gas to the fuel cell, a fuel-exhaust-gas discharge path that discharges a fuel exhaust gas from the fuel cell, a fuel-exhaust-gas recirculation path that recirculates the fuel exhaust gas to the anode side of the fuel cell, an oxidant-gas supply path that supplies the oxidant gas to the fuel cell, an oxidant-exhaust-gas discharge path that discharges an oxidant exhaust gas from the fuel cell, an oxidant-exhaust-gas recirculation path that recirculates the oxidant exhaust gas to the cathode side of the fuel cell, a recirculation power generation unit that, at a time of stopping the fuel cell, stops supply of the fuel gas, recirculates the fuel exhaust gas to the anode side of the fuel cell, seals the oxidant-exhaust-gas discharge path, recirculates the oxidant exhaust gas to the cathode side of the fuel cell, and causes the fuel cell to generate power, and a sealing unit that stops recirculation of the fuel exhaust gas, stops recirculation of the oxidant exhaust gas, stops power generation of the fuel cell, and seals the cathode side of the fuel cell.

According to this configuration of the exemplary embodiment, the fuel cell system can be stopped with the fuel gas being occluded in the anode side of the fuel cell, and the oxygen-consumed oxidant exhaust gas being occluded in the cathode side of the fuel cell. Even when the halt period of the fuel cell becomes long, therefore, impairment of the electrode catalyst and the catalyst support can be suppressed. At the time the fuel cell is activated, the fuel gas is present on the anode side, so that the high cathode potential is not generated upon activation of the fuel cell system, making it possible to suppress impairment of the catalyst.

Obviously, numerous modifications and variations of the present invention are possible in light of the above teachings. It is therefore to be understood that within the scope of the appended claims, the invention may be practiced otherwise than as specifically described herein.

What is claimed is:

1. A method for stopping an operation of a fuel cell system, the method comprising:
   raising an anode pressure of a fuel cell provided in the fuel cell system to a predetermined pressure, the anode pressure being a pressure on an anode side of a fuel cell provided in the fuel cell system;
   recirculating a fuel exhaust gas discharged from the fuel cell to the anode side of the fuel cell;
   sealing an oxidant-exhaust-gas discharge path through which an oxidant exhaust gas is to be discharged from the fuel cell at a downstream position of a connecting portion at which the oxidant-exhaust-gas discharge path is connected to an oxidant-exhaust-gas recirculation path;
   recirculating the oxidant exhaust gas to a cathode side of the fuel cell through the oxidant-exhaust-gas recirculation path;
   consuming the oxidant gas by generating power with the fuel cell after increasing the anode pressure so that the anode pressure decreases;
   stopping recirculation of the fuel exhaust gas;
   stopping recirculation of the oxidant exhaust gas; and
   sealing an oxidant-gas supply path through which the oxidant gas is to be supplied to the fuel cell at a downstream position of a connecting portion at which the oxidant-gas supply path is connected to an oxidant-exhaust-gas recirculation path.

2. The method according to claim 1, further comprising:
   determining that a remaining oxidant gas on the cathode side of the fuel cell is consumed,
   wherein the stopping of the recirculation of the fuel exhaust gas includes stopping the recirculation of the fuel exhaust gas if it is determined that the remaining oxidant gas on the cathode side of the fuel cell is consumed,
   wherein the stopping of the recirculation of the oxidant exhaust gas includes stopping the recirculation of the oxidant exhaust gas if it is determined that the remaining oxidant gas on the cathode side of the fuel cell is consumed, and
   wherein the sealing of the oxidant-gas supply path includes sealing the oxidant-gas supply path if it is determined that the remaining oxidant gas on the cathode side of the fuel cell is consumed.

3. The method according to claim 1, further comprising:
   determining that the anode pressure becomes less than the predetermined pressure,
   wherein the stopping of the recirculation of the fuel exhaust gas includes stopping the recirculation of the fuel exhaust gas if the anode pressure becomes less than the predetermined pressure, wherein the stopping of the recirculation of the oxidant exhaust gas includes stopping the recirculation of the oxidant exhaust gas if the anode pressure becomes less than the predetermined pressure, and wherein the sealing of the oxidant-gas supply path includes sealing the oxidant-gas supply path if the anode pressure becomes less than the predetermined pressure.

4. The method according to claim 1, further comprising:
determining that a cell voltage of the fuel cell becomes less than a predetermined value,
wherein the stopping of the recirculation of the fuel exhaust gas includes stopping the recirculation of the fuel exhaust gas if the cell voltage of the fuel cell becomes less than the predetermined value,
wherein the stopping of the recirculation of the oxidant exhaust gas includes stopping the recirculation of the oxidant exhaust gas if the cell voltage of the fuel cell becomes less than the predetermined value, and
wherein the sealing of the oxidant-gas supply path includes sealing the oxidant-gas supply path if the cell voltage of the fuel cell becomes less than the predetermined value.

5. The method according to claim 1, further comprising:
determining that a total voltage of the fuel cell becomes less than a predetermined value,
wherein the stopping of the recirculation of the fuel exhaust gas includes stopping the recirculation of the fuel exhaust gas if the total voltage of the fuel cell becomes less than the predetermined value,
wherein the stopping of the recirculation of the oxidant exhaust gas includes stopping the recirculation of the oxidant exhaust gas if the total voltage of the fuel cell becomes less than the predetermined value, and
wherein the sealing of the oxidant-gas supply path includes sealing the oxidant-gas supply path if the total voltage of the fuel cell becomes less than the predetermined value.

6. The method according to claim 1, further comprising:
controlling a generation voltage of the fuel cell when the fuel cell generates power by using the fuel exhaust gas and the oxidant exhaust gas.

7. The method according to claim 6, wherein the controlling of the generation voltage of the fuel cell includes controlling the generation voltage so that a generation current of the fuel cell becomes less than a predetermined maximum generation current.

8. The method according to claim 6, wherein the controlling of the generation voltage of the fuel cell includes controlling the generation voltage so that a variation width of the generation voltage becomes less than a predetermined maximum variation width.

9. The method according to claim 6, wherein the controlling of the generation voltage of the fuel cell includes controlling the generation voltage to be held at a constant voltage for a predetermined time.

10. The method according to claim 9,
wherein the stopping of the recirculation of the fuel exhaust gas includes stopping the recirculation of the fuel exhaust gas if a predetermined time elapses from a timing at which a generation current of the fuel cell has become less than a predetermined threshold value in the controlling of the generation voltage,
wherein the stopping of the recirculation of the oxidant exhaust gas includes stopping the recirculation of the oxidant exhaust gas if the predetermined time elapses from a timing at which the generation current of the fuel cell has become less than the predetermined threshold value in the controlling of the generation voltage, and wherein the sealing of the oxidant-gas supply path includes sealing the oxidant-gas supply path if the predetermined time elapses from a timing at which the generation current of the fuel cell has become less than the predetermined threshold value in the controlling of the generation voltage.

11. The method according to claim 1, further comprising:
supplying the oxidant gas to a diluter through a bypass path to purge the diluter.

12. A method for stopping an operation of a fuel cell system, the method comprising:
raising an anode pressure of a fuel cell provided in the fuel system to a predetermined pressure, the anode pressure being a pressure on an anode side of the fuel cell;
recirculating a fuel exhaust gas discharged from the fuel cell to the anode side of the fuel cell;
sealing an oxidant-gas supply path through which an oxidant gas is to be supplied to the fuel cell at an upstream position of a connecting portion at which the oxidant-gas supply path is connected to an oxidant-exhaust-gas recirculation path;
sealing an oxidant-exhaust-gas discharge path through which an oxidant exhaust gas is to be discharged from the fuel cell at a downstream position of a connecting portion at which the oxidant-exhaust-gas discharge path is connected to the oxidant-exhaust-gas recirculation path;
recirculating the oxidant exhaust gas to a cathode side of the fuel cell through the oxidant-exhaust-gas recirculation path;
consuming the oxidant gas by generating power with the fuel cell after increasing the anode pressure so that the anode pressure decreases;
stopping recirculation of the fuel exhaust gas; and
stopping recirculation of the oxidant exhaust gas.

13. The method according to claim 12, further comprising:
determining that a remaining oxidant gas on the cathode side of the fuel cell is consumed,
wherein the stopping of the recirculation of the fuel exhaust gas includes stopping the recirculation of the fuel exhaust gas if it is determined that the remaining oxidant gas on the cathode side of the fuel cell is consumed, and
wherein the stopping of the recirculation of the oxidant exhaust gas includes stopping the recirculation of the oxidant exhaust gas if it is determined that the remaining oxidant gas on the cathode side of the fuel cell is consumed.

14. The method according to claim 12, further comprising:
determining that the anode pressure which is a pressure becomes less than the predetermined pressure,
wherein the stopping of the recirculation of the fuel exhaust gas includes stopping the recirculation of the fuel exhaust gas if the anode pressure becomes less than the predetermined pressure, and
wherein the stopping of the recirculation of the oxidant exhaust gas includes stopping the recirculation of the oxidant exhaust gas if the anode pressure becomes less than the predetermined pressure.

15. The method according to claim 12, further comprising:
determining that a cell voltage of the fuel cell becomes less than a predetermined value,
wherein the stopping of the recirculation of the fuel exhaust gas includes stopping the recirculation of the fuel exhaust gas if the cell voltage of the fuel cell becomes less than the predetermined value, and
wherein the stopping of the recirculation of the oxidant exhaust gas includes stopping the recirculation of the oxidant exhaust gas if the cell voltage of the fuel cell becomes less than the predetermined value.

16. The method according to claim 12, further comprising:
determining that a total voltage of the fuel cell becomes less than a predetermined value,
wherein the stopping of the recirculation of the fuel exhaust gas includes stopping the recirculation of the fuel exhaust gas if the total voltage of the fuel cell becomes less than the predetermined value, and
wherein the stopping of the recirculation of the oxidant exhaust gas includes stopping the recirculation of the oxidant exhaust gas if the total voltage of the fuel cell becomes less than the predetermined value.

17. The method according to claim 12, further comprising:
controlling a generation voltage of the fuel cell when the fuel cell generates power by using the fuel exhaust gas and the oxidant exhaust gas.

18. The method according to claim 12, wherein the raising the anode pressure to the predetermined pressure provides an amount of hydrogen that is consumed during the step of recirculating the fuel exhaust gas and provides an amount of hydrogen that is held in the anode passage after the operation is stopped.

19. The method according to claim 12, wherein the stopping of the recirculation of the oxidant exhaust gas includes stopping the recirculation of the oxidant exhaust gas based on a voltage profile.

20. The method according to claim 12, further comprising closing a shutoff valve that supplies a fuel gas from a fuel source to the fuel cell,
wherein the raising of the anode pressure of the fuel cell includes raising the anode pressure to the predetermined pressure while the shutoff valve is closed.

21. The method according to claim 20, wherein the raising of the anode pressure of the fuel cell to the predetermined pressure is performed by raising the pressure of fuel gas remaining in the anode side of the fuel cell after closing the shutoff valve.

* * * * *